United States Patent
Nakazato et al.

(10) Patent No.: US 9,943,961 B2
(45) Date of Patent: Apr. 17, 2018

(54) APPARATUS, METHOD FOR CONTROLLING APPARATUS, AND STORAGE MEDIUM

(71) Applicant: CANON KABUSHIKI KAISHA, Tokyo (JP)

(72) Inventors: Yusuke Nakazato, Tokyo (JP); Kazuhiko Kobayashi, Yokohama (JP); Masahiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 14/726,958

(22) Filed: Jun. 1, 2015

(65) Prior Publication Data
US 2015/0352719 A1 Dec. 10, 2015

(30) Foreign Application Priority Data
Jun. 5, 2014 (JP) ................. 2014-117095

(51) Int. Cl.
*G05B 19/04* (2006.01)
*G05B 19/18* (2006.01)
(Continued)

(52) U.S. Cl.
CPC ........ *B25J 9/1674* (2013.01); *G05B 19/4183* (2013.01); *G05B 2219/31289* (2013.01); *G05B 2219/40202* (2013.01); *Y02P 90/10* (2015.11)

(58) Field of Classification Search
CPC ...... B25J 9/1674; B25J 9/1676; B25J 9/1664; B25J 19/06; B25J 13/088; B25J 11/0005;
(Continued)

(56) References Cited

U.S. PATENT DOCUMENTS

| 2009/0072631 | A1* | 3/2009 | Iida | ........................... B25J 19/06 307/326 |
| 2010/0191372 | A1* | 7/2010 | Nihei | ..................... B25J 9/1676 700/245 |

(Continued)

FOREIGN PATENT DOCUMENTS

| JP | 2007-061924 A | 3/2007 |
| JP | 2007-283448 A | 11/2007 |

(Continued)

OTHER PUBLICATIONS

Viola, et al., "Rapid Object Detection Using a Boosted Cascade of Simple Features", Computer Vision and Pattern Recognition, 2001. CVPR 2001. Proceedings of the 2001 IEEE Computer Society Conference, vol. 1. IEEE, 2001, pp. 1-10.

(Continued)

*Primary Examiner* — Rachid Bendidi
(74) *Attorney, Agent, or Firm* — Carter, DeLuca, Farrell & Schmidt, LLP

(57) ABSTRACT

An apparatus comprises a holding unit configured to hold data related to a worker; an obtaining unit configured to obtain measurement data for recognizing the worker; a recognizing unit configured to recognize the worker based on the data related to the worker and the measurement data; a determination unit configured to determine work information about a work which the worker and a robot perform on a target object together, corresponding to the recognized worker, based on a physical feature of the recognized worker; and a controlling unit configured to control the robot based on the work information so that the worker and the robot perform a work on the target object together.

15 Claims, 6 Drawing Sheets

(51) Int. Cl.
*B25J 9/16* (2006.01)
*G05B 19/418* (2006.01)

(58) Field of Classification Search
CPC ........... B25J 11/00008; G05B 19/4183; G05B 2219/31289; G05B 2219/40202; G05B 2219/39478; Y02P 90/10
See application file for complete search history.

(56) References Cited

U.S. PATENT DOCUMENTS

| | | | | |
|---|---|---|---|---|
| 2011/0184555 A1* | 7/2011 | Kosuge | ................. | B25J 9/1664 700/245 |
| 2013/0144440 A1* | 6/2013 | Shimizu | ................. | B25J 9/1664 700/262 |
| 2013/0184871 A1* | 7/2013 | Fudaba | ................... | B25J 13/02 700/264 |
| 2013/0184980 A1* | 7/2013 | Ichikawa | ............... | B25J 9/1676 701/301 |
| 2014/0067121 A1* | 3/2014 | Brooks | ................. | B25J 9/1676 700/255 |
| 2014/0135984 A1 | 5/2014 | Hirata | | |
| 2015/0314442 A1* | 11/2015 | Boca | ..................... | B25J 9/1664 700/253 |

FOREIGN PATENT DOCUMENTS

| | | |
|---|---|---|
| JP | 2008-158971 A | 7/2008 |
| JP | 2010-211726 A | 9/2010 |
| JP | 2014-094436 A | 5/2014 |

OTHER PUBLICATIONS

Turk, et al., "Eigenfaces for Recognition", Journal of Cognitive Neuroscience, vol. 3, No. 1 (1991): pp. 71-86.
Johnson, et al., "Using Spin Images for Efficient Object Recognition in Cluttered 3D Scenes," IEEE Trans. on PAMI, vol. 21, No. 5, pp. 433-449, 1999.
Abate, et al., "2D and 3D Face Recognition: A Survey", Pattern Recognition Letters vol. 28 (2007): pp. 1885-1906.
Makihara, et al., "Which Reference View is Effective for Gait Identification Using a View Transformation Model?", Proc. of the IEEE Computer Society Workshop on Biometrics 2006, New York, USA, Jun. 2006, pp. 1-8.
Reed, et al. "The HUMOSIM Ergonomics Framework: A new approach to digital human simulation for ergonomic analysis", SAE Technical Paper (2006), ISSN 0148-7191, pp. 1-14.
Shotton, et al., "Real-time Human Pose Recognition in Parts from Single Depth Images", Commun. ACM 56, 1 (Jan. 2013), 116-124.
Morioka, "A New Cell Production Assembly System with Human-robot Cooperation," Journal of the Robotics Society of Japan, 27, 10 (2009): 1088-1091.
Tateno et al., "A Model Fitting Method Using Intensity and Range Images for Bin-Picking Applications" (Interaction, VR, Robot Vision, <Feature Articles> Image Recognition/Understanding Papers), The Journal of Institute of Electronics, Information and Communication Engineers, D, Information/System 94, 8 (2011): 1410-1422.
Iwai et al., "A Survey on Face Detection and Face Recognition," Technical Reports of Information Processing Society of Japan, CVIM, 2005(38), 343-368, May 12, 2005.
Japanese Office Action corresponding to Japanese Application No. 2014-117095 dated Feb. 2, 2018, 3 pgs.

* cited by examiner

APPARATUS, METHOD FOR CONTROLLING APPARATUS, AND STORAGE MEDIUM

BACKGROUND OF THE INVENTION

Field of the Invention

The present invention relates to apparatuses, methods for controlling an apparatus, and storage media.

Description of the Related Art

In robot systems in which a robot works with a worker, it is essential to ensure the safety of the worker. To achieve this, Japanese Patent Laid-Open No. 2007-283448 states that a light curtain or the like is used to separate the operation range of a robot from the work range of a worker, and when the worker enters the operation range of the robot, the robot is stopped, or the driving speed of the robot is decelerated to a predetermined speed or less.

However, there is a problem that although a worker working with a robot knows what the movement of the robot is like, the robot stops or slows as the worker just approaches the robot, leading to a decrease in the overall work efficiency of the robot system.

With the above problem in mind, the present invention has been made. The present invention provides a technique for improving the work efficiency of a robot system in which a robot works with a human worker while ensuring the safety of the worker.

SUMMARY OF THE INVENTION

According to one aspect of the present invention, there is provided an apparatus comprising: a holding unit configured to hold data related to a worker; an obtaining unit configured to obtain measurement data for recognizing the worker; a recognizing unit configured to recognize the worker based on the data related to the worker and the measurement data; a determination unit configured to determine work information about a work which the worker and a robot perform on a target object together, corresponding to the recognized worker, based on a physical feature of the recognized worker; and a controlling unit configured to control the robot based on the work information so that the worker and the robot perform a work on the target object together.

Further features of the present invention will become apparent from the following description of exemplary embodiments (with reference to the attached drawings).

DESCRIPTION OF THE EMBODIMENTS

Figure 1:
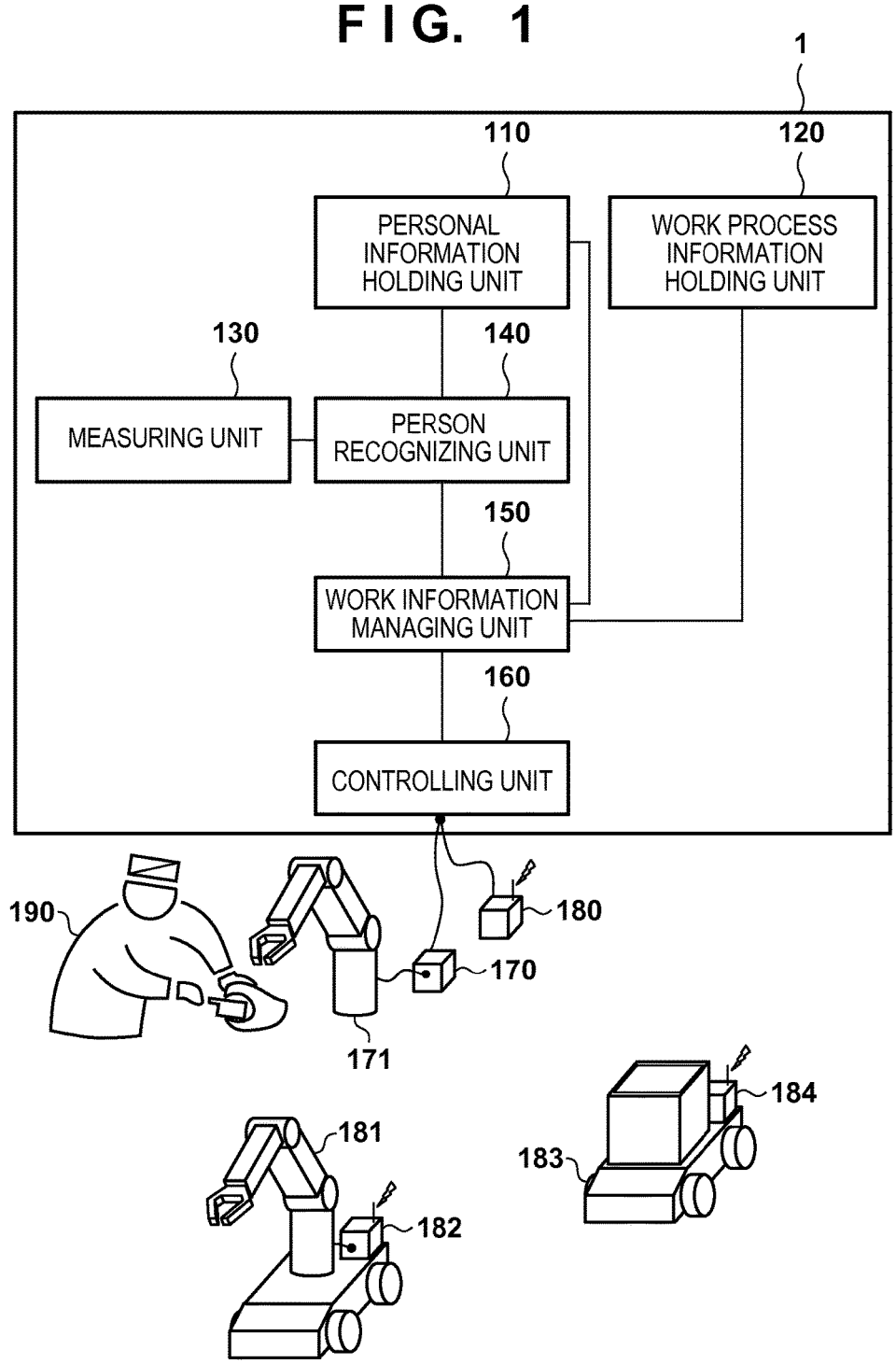
FIG. 1 is a diagram showing a configuration of an information processing apparatus 1 according to a first to a fourth embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

1. Overview

In a first embodiment, a robot system will be described which recognizes a person who performs a work, and drives a robot at a speed suitable for the worker that is changed, depending on an attribute, physical feature, etc. of the recognized person, whereby the work is performed in a time-efficient manner. In this embodiment, the driving speed of a robot is changed, depending on a work history, physical feature, etc. of a worker. The work history includes a skill level, information about a past work process, takt time, and the like. For example, a robot is driven at a low speed for an inexperienced worker to reduce mental stress, while a robot is driven at a high speed for an experienced worker, to improve work efficiency.

2. Configuration

A configuration of an information processing apparatus 1 according to this embodiment will be described with reference to FIG. 1. The information processing apparatus 1 includes a personal information holding unit 110, a work process information holding unit 120, a measuring unit 130, a person recognizing unit 140, a work information managing unit 150, and a controlling unit 160. A CPU (not shown) reads and executes a program from a memory, such as a RAM, ROM, or the like, to control an operation of each processing unit.

The information processing apparatus 1 is connected to a robot controller 170 and a controller 180. The robot controller 170 controls a robot 171. The controller 180 is wirelessly connected to robot controllers 182 and 184. The robot controllers 182 and 184 control a work robot 181 and a transfer robot 183, respectively. A worker 190 works on the side of the robot 171.

Figure 2:
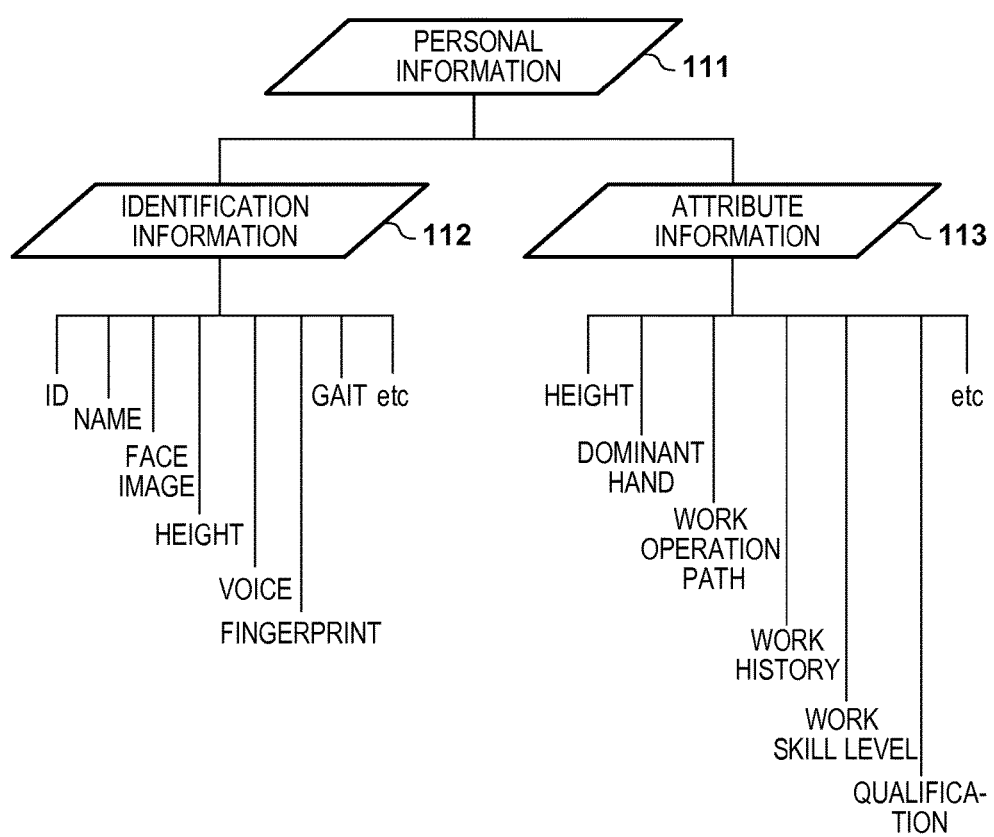
FIG. 2 is a diagram for describing personal information according to the first to fourth embodiments.

As shown in FIG. 2, the personal information holding unit 110 stores at least one piece of personal information 111 containing identification information 112 and attribute information 113. The identification information 112 is used to identify an individual. The attribute information 113 contains a physical feature, work history, etc. of an individual involved with a work.

The identification information 112 contains information for identifying each individual, such as an ID, name, or the like of the individual, and information against which the person recognizing unit 140 checks information obtained by the measuring unit 130. In this embodiment, as the identification information 112, an ID, a name, and at least one face image are held for the individual. The attribute information 113 contains work operation-related attributes, such as a physical feature and work history of the individual, and techniques, qualifications, etc. possessed by the individual. These items of information are used by the work information managing unit 150 and the controlling unit 160. In this embodiment, as the attribute information 113, a takt time is held for each work for the individual.

Figure 3:
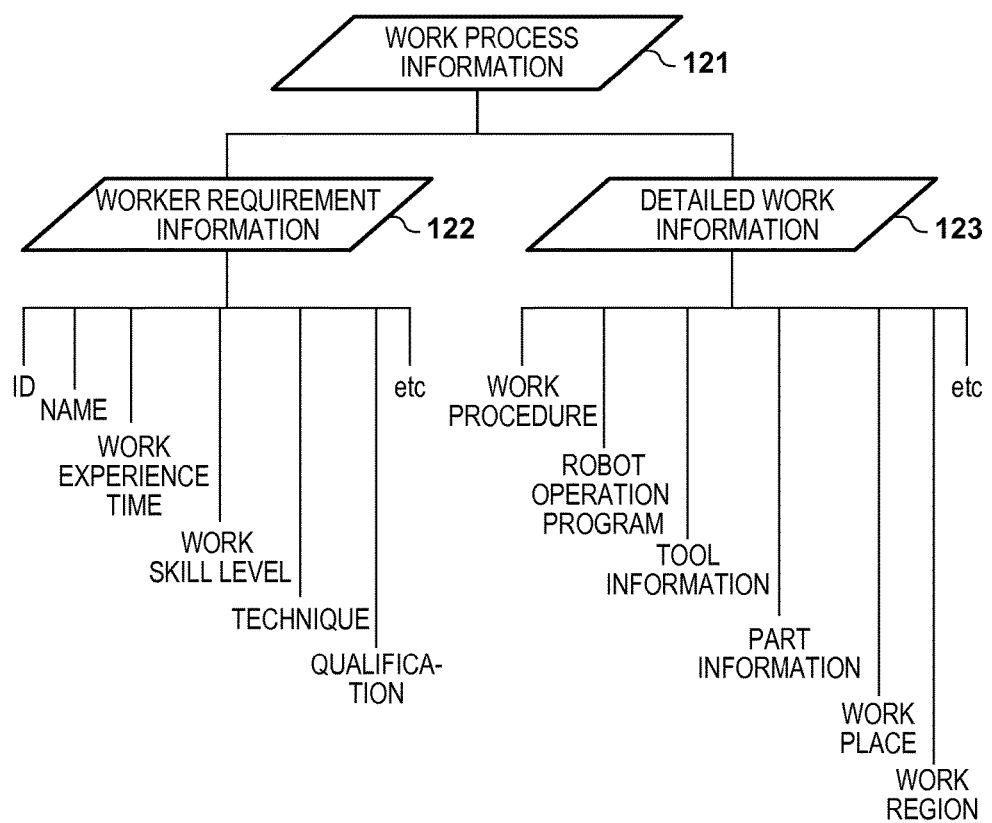
FIG. 3 is a diagram for describing work process information according to the first to fourth embodiments.

The work process information holding unit 120 holds at least one piece of work process information 121 shown in FIG. 3. The work process information 121 contains worker requirement information 122 and detailed work information 123 for a worker who performs a work. The worker requirement information 122 contains information for identifying an individual who performs a work, such as an ID, name, etc. of the person, and requirements for allowing a worker to perform details of the work. The detailed work information 123 contains at least one item of information about details of a work, such as a procedure of the work, tools required for the work, a robot that works with a worker and its operating program, a place and region for the work, and the like. In this embodiment, the work process information 121 holds the ID of an individual who performs a work as the worker requirement information 122, and a robot operating program as the detailed work information 123.

The measuring unit 130 obtains information which is checked against the identification information of individuals held in the personal information holding unit 110. In this embodiment, a camera is used to obtain an image of an environment.

The person recognizing unit 140 checks the information obtained by the measuring unit 130 against the identification information of individuals held in the personal information holding unit 110, to recognize a person. Specifically, a face is detected from an image obtained by the measuring unit 130 using a known technique (Paul Viola and Michael Jones, "Rapid object detection using a boosted cascade of simple features," Proceedings of the 2001 IEEE Computer Society Conference on Computer Vision and Pattern Recognition, CVPR 2001, Vol. 1, IEEE, 2001, etc.). Next, the detected face is checked against faces of individuals held in the personal information holding unit 110 using a known technique (Matthew Turk and Alex Pentland, "Eigenfaces for recognition," Journal of cognitive neuroscience 3.1 (1991): 71-86, etc.). As a result of the checking, if a matching person is found, the person is recognized, and the ID of the recognized individual is sent to the work information managing unit 150. If no person matching the detected person is found, the detected person is recognized as an unknown person, and the work information managing unit 150 is notified of such a situation.

The work information managing unit 150 obtains the personal information 111 held in the personal information holding unit 110 and the work process information 121 held in the work process information holding unit 120 based on a person recognized by the person recognizing unit 140 to manage a work which is performed by a robot and a worker. Specifically, the personal information 111 and work process information 121 corresponding to the ID of an individual recognized by the person recognizing unit 140 are obtained, and the combination of the personal information 111 and the work process information 121 is held as the work information.

The controlling unit 160 controls at least one robot based on the work information managed by the work information managing unit 150. The work information is a combination of the personal information 111 and the work process information 121. The work information is obtained from the work information managing unit 150, and a robot operating program is obtained from the detailed work information 123 holding the work information. Thereafter, the driving speed of a robot is set based on the takt time held in the personal information 111, and the operating program is used to control and drive the robot. Specifically, the driving speed is set using a monotonically decreasing function whose argument is a takt time and whose return value is a driving speed so that the driving speed increases in inverse proportion to the takt time. As a result, a robot is driven at a low speed for an inexperienced worker having a long takt time to reduce mental stress, while a robot is driven at a high speed for an experienced worker having a short takt time to improve work efficiency. Note that, in this embodiment, the robot 171 of FIG. 1 which can perform a gripping operation is employed. The robot 171 is controlled by the controlling unit 160 through the robot controller 170.

3. Flow of Process

Figure 4:
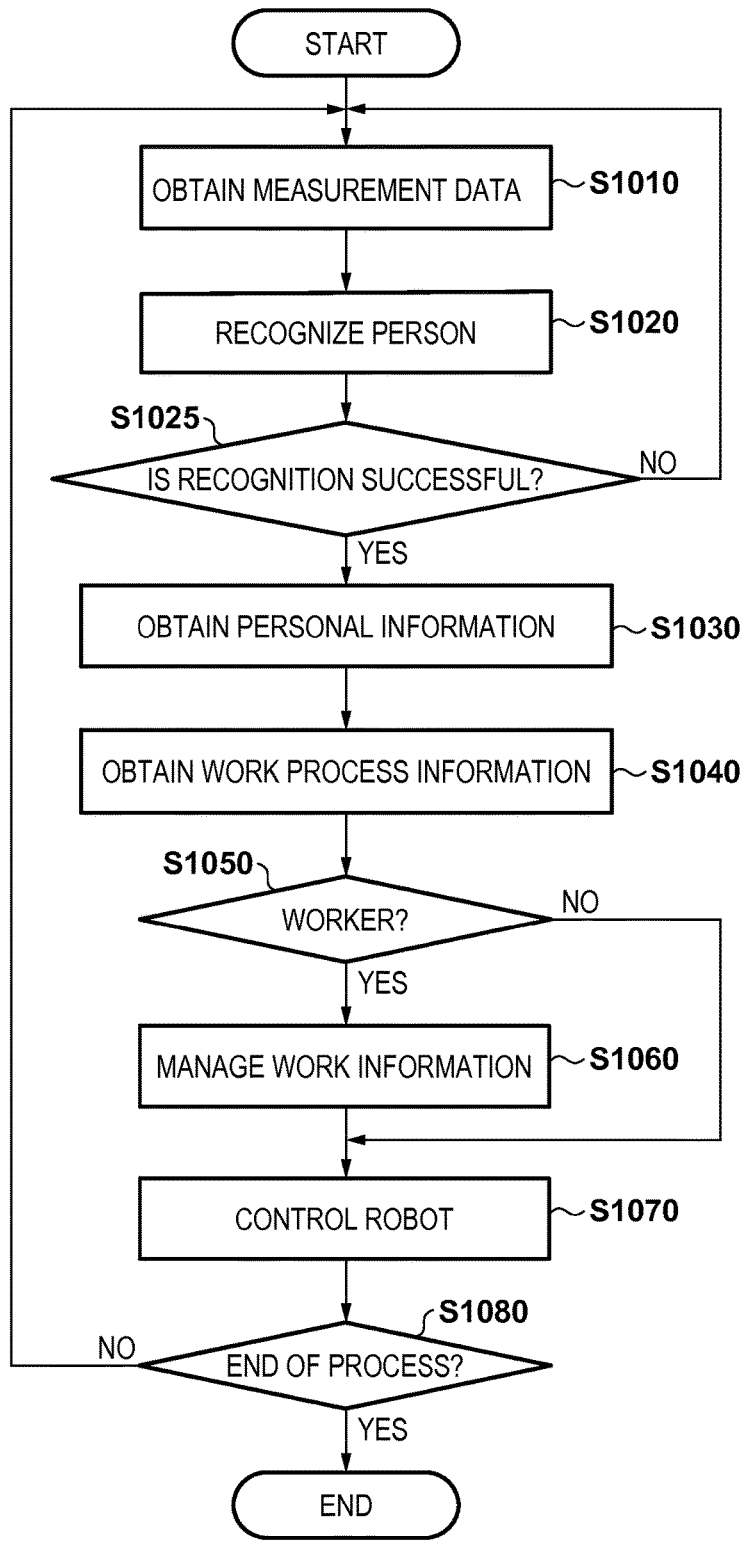
FIG. 4 is a diagram for showing the outline of a process according to the first to fourth embodiments.

Steps of a process performed by the information processing apparatus 1 of this embodiment will be described with reference to a flowchart shown in FIG. 4. Note that it is assumed that the personal information 111 and the work process information 121 are previously held in the personal information holding unit 110 and the work process information holding unit 120, respectively.

(Step S1010)

In step S1010, the measuring unit 130 obtains measurement data for use in checking by the person recognizing unit 140. Here, as the measurement data, an image of an environment is obtained.

(Steps S1020 and S1025)

In step S1020, the person recognizing unit 140 detects a person from the measurement data (image) obtained by the measuring unit 130, and checks the person against the identification information 112 (face images) of individuals held in the personal information holding unit 110, to recognize the individual. If a person is not detected (NO in step S1025), control proceeds to step S1010, in which measurement is performed again. On the other hand, if an individual or an unknown person is recognized (YES in step S1025), control proceeds to step S1030.

(Step S1030)

In step S1030, the work information managing unit 150 obtains the personal information 111 matching the ID of the person recognized in step S1020, from the personal information holding unit 110.

(Step S1040)

In step S1040, the work information managing unit 150 obtains the work process information 121 matching the ID of the person recognized in step S1020, from the work process information holding unit 120.

(Step S1050)

In step S1050, if the work process information 121 about a work process in charge of the person recognized in step S1020 is not obtained (i.e., there is no work process information matching the ID of the recognized individual in the work process information 121 held in the work process information holding unit 120), the work information managing unit 150 determines that an unknown person has been recognized, and control proceeds to step S1070. On the other hand, if the work process information matching the ID of the recognized individual is obtained, control proceeds to step S1060.

(Step S1060)

In step S1060, the work information managing unit 150 holds a combination of the personal information 111 obtained in step S1030 and the work process information 121 obtained in step S1040 as the work information.

(Step S1070)

In step S1070, the controlling unit 160 controls the robot 171 based on the work information held in the work information managing unit 150 so that the robot 171 works with the worker 190. Unless the worker 190 is an unknown person, the robot 171 is set to a driving speed which is inversely proportional to the takt time of the individual held in the work information. Also, the measurement and person recognition may be performed in the background while controlling the robot 171.

(Step S1080)

In step S1080, the controlling unit 160 determines whether or not to end the process based on the presence or absence of an event such as turning off of the information processing apparatus 1, inputting of an instruction to stop the work, or the like. If the controlling unit 160 determines to end the process, the steps in the flowchart of FIG. 4 are ended. On the other hand, if the controlling unit 160 determines not to end the process, control proceeds to step S1010, in which the steps are repeated.

4. Variation

In this embodiment, an example has been described in which the personal information holding unit 110 holds at least one piece of the personal information 111 containing the identification information 112 holding the ID, name, and at least one face image of each individual and the attribute information 113 holding the takt time of each individual for each work. However, the identification information 112 and the attribute information 113 are not limited to these examples.

The identification information 112 may be information which can be used to identify an individual. The identification information 112 may also be a two-dimensional image, range image, or three-dimensional model of a face or body, or a set of feature amounts such as SIFT, SpinImages (A. E. Johnson and M. Hebert, "Using Spin Images for Efficient Object Recognition in Cluttered 3D Scenes," IEEE Trans. on PAMI, vol. 21, no. 5, pp. 433-449, 1999), or the like. The identification information 112 may also be a parameter such as a height, weight, chest circumference, or the like, or a feature amount such as an image or moving image of a physical feature (e.g., a fingerprint, veins, an iris, a voice, writing, a gait, etc.), or the like. The identification information 112 may also be one which can be used to identify an individual, such as a predetermined pattern (e.g., a signature, password, gesture, etc.), ID card, or the like. The identification information 112 may also be a combination of items of identification information.

The attribute information 113 may have at least one attribute related to a work. The attribute information 113 may be a physical feature of an individual, such as a height, weight, dominant hand, habit (e.g., an operating motion in a work, etc.), or the like, a work history, such as works which the individual performed in the past, the lengths of time the individual performed the works, or the like, a list of techniques, knowledge, skills, and qualifications possessed by the individual, or the like.

Also, in this embodiment, an example has been described in which the work process information holding unit 120 holds at least one piece of the work process information 121 containing a combination of the detailed work information 123 holding an operating program for a robot in a work and the worker requirement information 122 holding the ID of an individual who performs the work. However, the work process information 121 is not limited to this example. The work process information 121 may hold a worker requirement for a worker who performs a work, and details of the work.

The worker requirement information 122 may have information for identifying a worker, such as an ID, name, or the like of an individual who performs a work, or a requirement for a worker who performs details of the work. The worker requirement information 122, which is associated with the attribute information 113 of the personal information 111 held in the personal information holding unit 110, is used to search for a worker who satisfies the requirement while checking it against the attribute information 113.

Also, the detailed work information 123 may have at least one item of information about details of a work, such as tools required for a work procedure or work, a robot which works with a worker or its operating program, a work place or region, a work time, and the like. The work procedure may be a work schedule table for a worker or a list of paths, positions, and orientations of a robot or worker in the course of a robot operating program or work. The information about work tools may be names and shapes of the tools, positions and orientations of the tools, ways to use the tools, or programs for causing a robot to use the tools. The work place or region may be a map, two-dimensional region, or three-dimensional region indicating a position or work range where a worker and a robot work, and a region which is dangerous to enter.

Also, in this embodiment, an example has been described in which the measuring unit 130 is a camera which is used to obtain an image of an environment. However, the measuring unit 130 may only need to obtain information which is checked against the identification information 112 of each individual held in the personal information holding unit 110. A two-dimensional image or range image may be obtained using a measuring device, such as a range sensor, RGB-D camera, or the like. From these items of information, a three-dimensional model or feature amount may be obtained. The measuring device may be a thermometer or infrared camera. There may be a plurality of measuring devices. The measuring device may also be a weighing scale or microphone, or a sensor which is used to measure a fingerprint, veins, an iris, or the like. The measuring device may also be an input device, such as a touchscreen, scanner, keyboard, ID card reader, or the like. The measuring device may also be a combination of measuring units which can be used to obtain information which allows for identification of an individual.

Also, in this embodiment, an example has been described in which the person recognizing unit 140 detects a person from an image obtained by the measuring unit 130 using a known technique, and checks the person against face images of persons held in the personal information holding unit 110 using a known technique, to recognize the person. However, the configuration of the person recognizing unit 140 is not limited to techniques using an image. Any technique may be employed that can be used to check the measurement data obtained by the measuring unit 130 against the identification information 112 of persons held in the personal information holding unit 110 to recognize a measured person. For example, even if the measuring unit 130 is a range sensor or RGB-D camera, the checking may be performed using a known technique (Abate, Andrea F., et al., "2D and 3D face recognition: A survey," Pattern Recognition Letters 28, 14 (2007): 1885-1906, etc.). Measurement data obtained by various sensors may be checked against fingerprints, veins, irises, writing, voices, gaits, or the like. The checking against fingerprints, veins, irises, writing, or the like may be performed by pattern matching between an image obtained by the measuring unit 130 and images of those features held as the identification information 112. In the case of a voice, a voice print obtained by the measuring unit 130 may be checked against voice prints held as the identification information 112 by pattern matching. In the case of a gait, a moving image obtained by the measuring unit 130 may be checked using a known technique (Y. Makihara, R. Sagawa, Y. Mukaigawa, T. Echigo, and Y. Yagi, "Which Reference View is Effective for Gait Identification Using a View Transformation Model?," Proc. of the IEEE Computer Society Workshop on Biometrics 2006, New York, USA, Jun., 2006, etc.). A password or gesture which is input using an input device, such as a touchscreen, keyboard, or the like, may be checked against previously held identification information, such as passwords, patterns, or the like. A person matching the ID of an individual read using an ID card reader may be recognized. Also, even when a person is successfully detected, then if there is no information matching the personal information, the person may be recognized as an unknown person. Moreover, if the measurement data contains information about a plurality of persons, the plurality of persons may be recognized.

Also, in this embodiment, an example has been described in which the work information managing unit 150 obtains the personal information 111 held in the personal information holding unit 110 that is about an individual recognized by the person recognizing unit 140, and the work process information 121 held in the work process information holding unit 120 that is about a work process in charge of the individual, and holds the combination as the work information. However, the work information managing unit 150 may only need to obtain the personal information 111 held in the personal information holding unit 110 and the work process information 121 held in the work process information holding unit 120, corresponding to an individual recognized by the person recognizing unit 140, to manage a work which is performed by a robot and a worker. If a work which is performed by a worker is previously registered in the work process information 121, the work information managing unit 150 may obtain the personal information 111 about a recognized individual and the work process information 121 about a work process in charge of the individual, and hold the combination as the work information. If a work which is performed by a recognized individual is not registered in the work process information 121, the attribute information 113 of the recognized individual may be checked against the worker requirement information 122 held in the work process information 121, and the individual satisfying the worker requirement information 122 may be registered in the work process information 121. Also, if the person recognizing unit 140 is used to measure a position, orientation, operation, etc. of the individual, the operation information of the individual may be converted into information such as a time, takt time, number of times, etc. of a work performed by the individual, which may be additionally held as the work information.

Also, in this embodiment, an example has been described in which the controlling unit 160 obtains a robot operating program from the work process information held in the personal information 111 managed by the work information managing unit 150, and a takt time of a work to be performed from the personal information 111, to control a robot at a driving speed suitable for the takt time so that the robot works with a worker. However, the controlling unit 160 may only need to control at least one robot based on the work information managed by the work information managing unit 150. The driving speed of a robot may be set to operate during substantially the same time as the takt time. If the personal information 111 contains the length of time a worker has experienced a work, the driving speed of a robot may be set, assuming that a worker has better skills with an increase in the length of time the worker has experienced a work. If the personal information contains a skill level which increases as a worker is more experienced, the driving speed of a robot may be set to increase with an increase in skill level. Also, the driving speed of a robot may be set based on a takt time which is calculated by conducting a simulation of a work operation using a physical feature, past operation path, etc. of a worker.

Also, a robot controlled in this embodiment is not limited to robot arms, such as the robot 171 shown in FIG. 1. Any automatic machine in any form or configuration that works with a worker may be employed. A dual-arm robot, or a work robot having a drive unit, such as a walking robot, a wheeled robot, or the like (the work robot 181), may be employed. An automatic transfer vehicle (the transfer robot 183) may be employed. A plurality of robots may be employed. Here, the work robot 181 is operated under the control of the robot controller 182 which is instructed by the controller 180. Similarly, the transfer robot 183 is operated under the control of the robot controller 184 which is instructed by the controller 180.

As described above, a person who performs a work can be recognized, and a robot can be driven at a speed suitable for the worker based on an attribute, physical feature, etc. of the recognized person. This improves work efficiency.

Second Embodiment: Path is Changed, Depending on Physical Feature of Worker

In a second embodiment, a robot system will be described in which a position, orientation, and path of a robot are set based on an attribute, physical feature, etc. of a worker, to reduce the worker's load, whereby a work can be performed in a time-efficient manner. More specifically, a position, orientation, and path of a robot are set based on a physical feature of a worker, such as a height, dominant hand, habit, or the like, or an operating motion in a work which the worker performed in the past. For example, a position where a robot supplies parts is set based on the height of a worker who works with the robot.

The apparatus has a configuration and process flow similar to those of the first embodiment, except for the following differences.

In this embodiment, the personal information holding unit 110 holds a work operation path of a work performed by each individual as the attribute information 113 held for the individual.

The controlling unit 160 controls the path of a robot arm based on the attribute information 113 (the work operation path of a worker) and work process information 121 of the worker managed by the work information managing unit 150. In this embodiment, a robot arm and a worker work together while exchanging objects, such as parts, tools, and the like. To achieve this, an end effector (gripping device) of the robot arm is moved to a position in the vicinity of a hand of the worker based on the worker's past work operation path held in the attribute information 113, where the end effector receives or gives an object from or to the worker. As a result, the worker does not have to move much, and therefore, can perform a work more quickly.

<Variations>

The attribute information 113 held in the personal information holding unit 110 is not limited to the work operation path, and may be a physical feature of an individual, such as a height, weight, dominant hand, or the like. In this case, the controlling unit 160 may cause an end effector (gripping device) of a robot arm to move to a position which is proportional to the height of the individual, where the end effector receives or gives an object from or to the worker.

Alternatively, an operation of a worker may be simulated based on a physical feature of the individual using a known technique (Reed, Matthew P., et al., "The HUMOSIM Ergonomics Framework: A new approach to digital human simulation for ergonomic analysis," SAE Technical Paper (2006): 01-2365, etc.), to predict a position or orientation of the individual, a position or orientation of the individual's hand, or the like. In this case, a position or orientation of a robot, or a path of an arm or the like, may be set so that an end effector of the robot can be moved to a position in the vicinity of the predicted position. Moreover, the robot may not be a robot arm. The robot may be an automatic transfer vehicle (transfer robot). When a worker extracts or places a part from or on a transfer robot, the transfer robot or a transfer container may be moved to a position which does not cause the individual to change their orientation very much, based on a physical feature or habit (the worker's work operation path) of the individual. The position which does not cause the individual to change their orientation very much may be determined by simulation based on a physical feature of the individual using a known technique. An orientation of the individual may be measured using a known technique (Jamie Shotton, Toby Sharp, Alex Kipman, Andrew Fitzgibbon, Mark Finocchio, Andrew Blake, Mat Cook, and Richard Moore, 2013, Real-time human pose recognition in parts from single depth images, Commun. ACM 56, 1 (January 2013), 116-124, etc.), and a position of a transfer robot or transfer container may be determined so that the individual does not have to change their orientation very much. The position which does not cause the individual to change their orientation very much may be calculated using a nonlinear optimization or genetic algorithm. In this case, a variation in an orientation of the individual may be used as a cost function, and the position which minimizes the cost function is calculated. Also, there may be a plurality of robots.

As described above, according to this embodiment, a person who performs a work is recognized, and a position, orientation, and path of a robot are set based on an attribute, physical feature, etc. of the recognized person, whereby the load on the worker can be reduced. This can improve work efficiency.

Third Embodiment: Stop when Person not Registered Approaches

In a third embodiment, a robot system will be described in which a risk that a person who is not a worker enters a work region can be avoided based on the personal information 111 about an individual recognized by the person recognizing unit 140 and the work process information 121 about a work performed by the individual.

The apparatus has a configuration and process flow similar to those of the first embodiment, except for the following differences.

The work process information holding unit 120 holds worker requirement information and detailed work information as work process information. The detailed work information contains a time at which a worker performs a work and a range of a work region.

The person recognizing unit 140 checks measurement data obtained by the measuring unit 130 against the personal information 111 held in the personal information holding unit 110 to recognize a person. Moreover, a position of the person is recognized using a known technique (Jamie Shotton, Toby Sharp, Alex Kipman, Andrew Fitzgibbon, Mark Finocchio, Andrew Blake, Mat Cook, and Richard Moore, 2013, Real-time human pose recognition in parts from single depth images, Commun. ACM 56, 1 (January 2013), 116-124, etc.). If a detected person does not match any individual in the personal information, the person is recognized as an unknown person.

The work information managing unit 150 obtains the personal information 111 and position of an individual recognized by the person recognizing unit 140, and the work process information 121 about a work performed by the individual, and holds the combination as the work information. Moreover, the work information managing unit 150 compares the position (worker's position) of the individual and a time (measurement data obtaining time) at which measurement data obtained by the measuring unit 130 is obtained, with a work range and work time held in the work process information 121. If the worker's position is within the work range and the measurement data obtaining time is out of the work time range, i.e., the recognized individual enters the work range at a time which is not a work time held in the work process information 121, the worker is determined to be an unknown person.

If an unknown person is not recognized, the controlling unit 160 controls a robot in a manner similar to that of the first and second embodiments. On the other hand, if an unknown person is recognized, the driving speed of a robot is decelerated or stopped in order to avoid danger.

<Variations>

In this embodiment, an example has been described in which if an unknown person is detected, the controlling unit 160 decelerates or stops a robot. However, any technique that can alert a worker or avoid danger based on the work information may be employed. If a position or orientation of a detected person is recognized, a robot may be moved in a direction away from the position of the person, or a robot may be moved to block an unknown person so that the unknown person does not enter a dangerous region, such as an operation range of the robot, or a robot may guide an unknown person into a safe place.

As described above, according to this embodiment, a worker is recognized, and if a person who is not a worker enters a work region, a robot takes an action to avoid danger, whereby a registered worker can work normally. As a result, a work can be performed without a decrease in efficiency.

Fourth Embodiment: Presentation of Information to Worker

In a fourth embodiment, a robot system will be described which further has a function of presenting a state of the system, in addition to the functions of the above embodiments.

In this embodiment, an example will be described in which a state of recognition of a person is presented. In the third embodiment, if a recognized person is not a person who performs a work, a robot is decelerated or stopped to ensure safety. In this embodiment, if a recognized person is not a person who performs a work, warning information is presented to persons around a robot to ensure safety.

Figure 5:
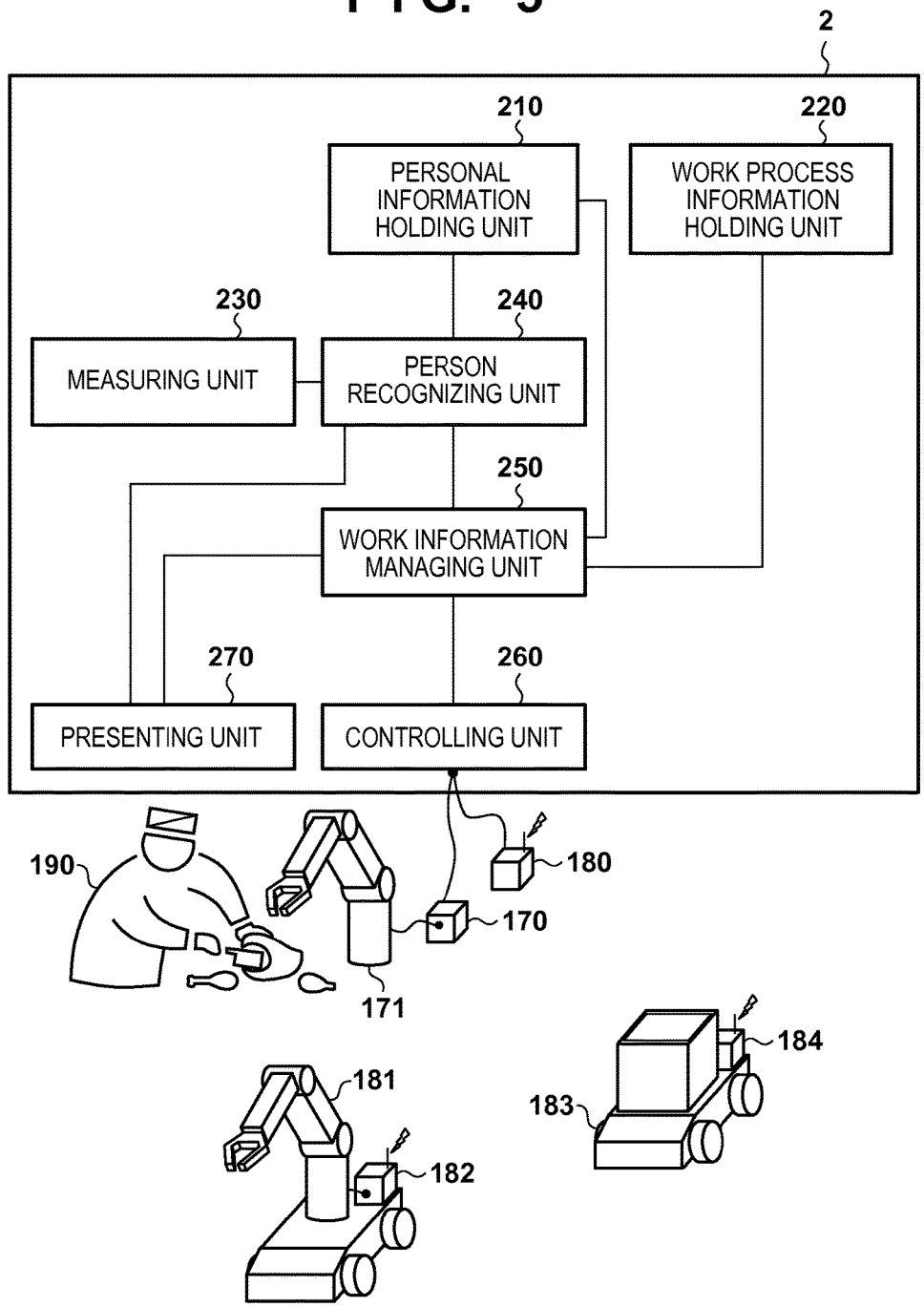
FIG. 5 is a diagram showing a configuration of an information processing apparatus 2 according to a fifth embodiment.

In this embodiment, a configuration of an information processing apparatus 2 is shown in FIG. 5. The information processing apparatus 2 further has a presenting unit 270 in addition to the configuration of the information processing apparatus 1 of FIG. 1. A personal information holding unit 210 to a controlling unit 260 are similar to the personal information holding unit 110 to the controlling unit 160 of the third embodiment. Also, the other reference characters in the system configuration indicate components similar to those of the above embodiments.

If the person recognizing unit 240 or the work information managing unit 250 recognizes an unknown person, the presenting unit 270 outputs a warning voice from a loudspeaker. This alerts persons, such as an unknown person, a worker, a person who manages a work, and the like, whereby a work can be performed while safety is maintained.

<Variations>

The presenting unit 270 may present a state of at least one of the person recognizing unit 240, the work information managing unit 250, and the controlling unit 260. More specifically, the presenting unit 270 may present at least one of information indicating a state of recognition of an individual by the person recognizing unit 240, work process information about a work process performed by an individual that is managed by the work information managing unit 250, and information indicating a state of control of a robot controlled by the controlling unit 260. A device which is used in presentation may be a device which produces a sound, such as a loudspeaker, buzzer, or the like, a light source, such as a display, lamp, LED, or the like, a flag, a gate, or a barrier. Any device that can notify persons around a robot of a state of the system may be employed. As to the state information to be presented, a state of recognition of a person may be presented through a loudspeaker. Alternatively, a light source or display set in an environment or robot may be caused to emit light or display a message. Alternatively, an obstacle, warning flag, or the like may be presented to an unknown person. Also, in order to present a state of recognition of a person, a display or the like may be used to present the personal information 111, such as a name, face image, etc. of an individual recognized by the person recognizing unit 240. In order to present a state of a work, the work process information 121 of a work performed by a recognized individual is obtained from the work information managing unit 250, and a procedure or manual for the work may be presented. In order to present a state of control of a robot, a driving speed of a robot, details of a work of a robot, an operating program or path of a robot, or internal states, such as temperature, operation time, and the like, may be presented.

As described above, according to this embodiment, a worker or persons around a robot can know a state of a system, whereby a work can be performed while safety is maintained.

Fifth Embodiment: Preparation of Parts or Tools by Robot Based on Person Recognition In a fifth embodiment, a robot system will be described in which preparation for a work can be automatically performed based on work process information of a recognized individual.

The apparatus has a configuration and process flow similar to those of the first embodiment, except for the following differences.

The work process information holding unit 120 holds the worker requirement information 122 about a worker and the detailed work information 123 about a work performed by the worker, as the work process information 121. In this embodiment, the worker requirement information 122 contains an ID of an individual which performs the work. The detailed work information 123 contains at least one of information about tools required for a work performed by a worker and information about parts to be used in the work. The information about tools or parts contains a place where the tools or parts are stored and a place where the tools or parts are placed during a work.

The controlling unit 160 controls a robot to prepare for a work based on the work information managed by the work information managing unit 150. The controlling unit 160 controls at least one of the work robot 181, transfer robot 183, etc. of FIG. 1, to transfer and carry at least one of a set of tools or a set of parts described in the work process information 121 from a storage place using a known technique (Morioka, "A New Cell Production Assembly System with Human-robot Cooperation," Journal of the Robotics Society of Japan, 27, 10 (2009): 1088-1091, etc.), and place the tools or parts at a predetermined position described in the work process information 121.

As a result, as soon as a worker arrives at a work place, the worker begins performing a work, whereby the work can be performed in a time-efficient manner.

<Variations>

The information about tools or parts contained in the work process information 121 may be information which is required to transfer tools or parts. The information about tools or parts contained in the work process information 121 may be a place where the tools or parts are stored, an image, feature amount, or shape information for recognizing or gripping the tools or parts, or a combination thereof. The work process information 121 may also further contain a robot operating program. The information about tools may contain attribute information, such as an owner, handedness, size, weight, and the like. These items of information may be used to select and arrange tools based on personal information of a worker. For example, tools dedicated to an individual worker may be selected, or tools may be selected based on attribute information, such as the dominant hand of a worker, or the like. Among the selected tools, a tool required for a work step may be selected.

The controlling unit 160 controls a robot based on the work information managed by the work information managing unit 150 to prepare for a work. A known technique (Tateno, Kotake, and Uchiyama, "A Model Fitting Method Using Intensity and Range Images for Bin-Picking Applications" (Interaction, VR, Robot Vision, <Feature Articles> Image Recognition/Understanding Papers)," The Journal of Institute of Electronics, Information and Communication Engineers, D, Information/System 94, 8 (2011): 1410-1422, etc.) may be used to recognize a position and orientation of a tool or part, pick the tool or part using a robot, load the tool or part onto a transfer robot, and place the tool or part at a predetermined position. Parts or tools may be transferred using a mechanism which supplies parts or tools using a conveyer belt and the like.

As described above, according to this embodiment, preparation for a predetermined work is automatically performed based on a recognized worker and work process information about a work process to be performed, whereby time and effort which it takes for the worker themselves to perform preparation can be reduced. This can improve work efficiency.

Sixth Embodiment: Updating of Work Process Information

In a sixth embodiment, a robot system will be described which has a function of updating at least one of personal information, work process information, and work information in addition to the above embodiments.

Figure 6:
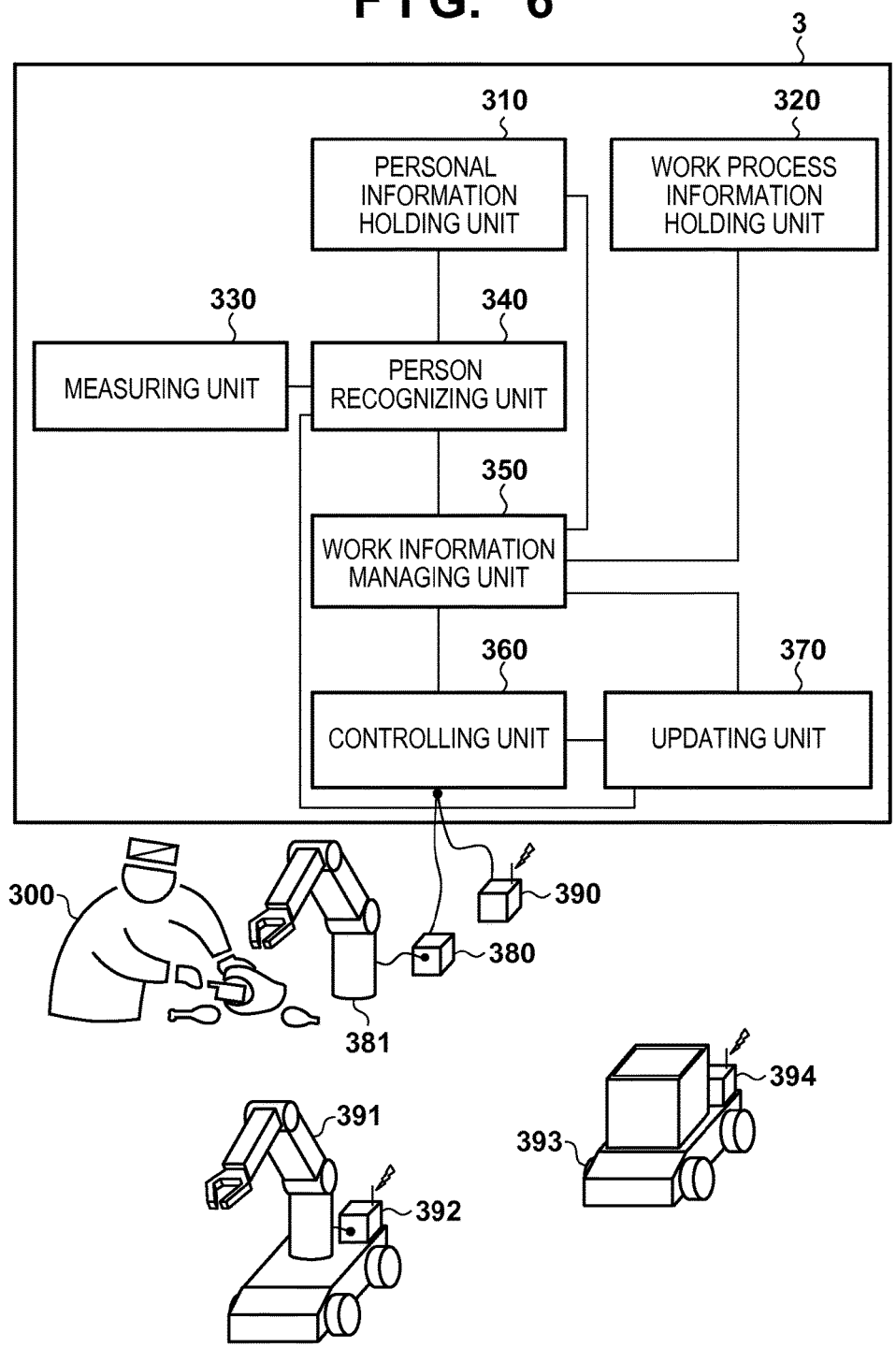
FIG. 6 is a diagram showing a configuration of an information processing apparatus 3 according to a sixth embodiment.

A configuration of an information processing apparatus 3 according to this embodiment is shown in FIG. 6. The information processing apparatus 3 further has an updating unit 370 in addition to the configuration of the information processing apparatus 1 of FIG. 1. A personal information holding unit 310 to a controlling unit 360 are similar to the personal information holding unit 110 to the controlling unit 160 of the first embodiment.

Attribute information of the personal information held in the personal information holding unit 310 of this embodiment contains the number of times each work has been performed.

The updating unit 370 of this embodiment updates the personal information based on the work information managed by the work information managing unit 350. The work information contains the personal information of an individual recognized by the person recognizing unit 340, and the work process information about a work process performed by the individual. Therefore, an item corresponding to the attribute information of the personal information is extracted from the detailed work information contained in the work process information, to update the attribute information. Specifically, the number of times contained in the attribute information is incremented for a work corresponding to the work process information about a work process which is being performed by a person.

<Variations>

The updating unit 370 may update or add at least one of the personal information, the work process information, and the work information. If the work information managing unit 350 holds a work time, takt time, number of times, etc. of a work performed by a worker as the work information, these items of information may be added or updated as a work history to or in the attribute information of the personal information of a worker. Also, the personal information or work process information may be manually updated or added using an input device, such as a mouse, keyboard, touch sensor, or the like. The work process information, work time, number of times, etc. of a work performed by a worker may be automatically or manually added as a work history to the attribute information of the personal information of the worker. Measurement data of a person which is not recognized may be added or updated as identification information to or in the personal information using an input device. An operation or orientation of a worker may also be measured using a measuring unit or input using an input device, to learn the operation or orientation of the worker. The learning data may be added to or updated in the work process information held in the work process information holding unit 320, or may be added to or updated in the attribute information of the personal information of the worker themselves held in the personal information holding unit 310. Also, the updating unit 370 may be used in combination with the presenting unit 270 of the fourth embodiment.

As described above, according to this embodiment, a work can be improved by updating personal information, work process information, work information, and the like. This can improve work efficiency.

<Definition>

The personal information holding unit 110 needs only to hold personal information containing a combination of identification information for identifying an individual, and attribute information, such as a physical feature, work history, etc. related to a work of the individual. The personal information holding unit 110 holds the personal information of at least one person, and the identification information and the attribute information are associated with a worker.

The identification information is information for identifying an individual, such as an ID, name, etc. of the person, and information against which information obtained by the measuring unit 130 is checked by the person recognizing unit 140. Therefore, the identification information may be a two-dimensional image, range image, or three-dimensional model of a face or body, or a set of feature amounts such as SIFT, SpinImages (A. E. Johnson and M. Hebert, "Using Spin Images for Efficient Object Recognition in Cluttered 3D Scenes," IEEE Trans. on PAMI, vol. 21, no. 5, pp. 433-449, 1999), or the like, depending on the person recognizing unit. The identification information may also be a parameter such as a height, weight, chest circumference, or the like, or a physical feature such as a fingerprint, veins, an iris, a voice, writing, a gait, or the like. The identification information may also be one which can be used to identify an individual, such as a predetermined pattern (e.g., a signature, password, gesture, etc.), ID card, or the like. The identification information may also be a combination of items of identification information that can be used to identify an individual.

The attribute information contains work-related attributes, such as a physical feature and work history of the individual, techniques, qualifications, etc. possessed by the individual, and the like. These items of information are used by the work information managing unit 150 and the controlling unit 160. Specifically, the attribute information contains at least one of physical features of the person, such as a height, weight, dominant hand, habit (work operation motion, etc.), and the like, a work history, such as works which the person experienced in the past, the lengths of time the person experienced the works, and the like, techniques, knowledge, skill levels, qualifications, and the like possessed by the worker, and the like.

The personal information may be held in a storage device, such as a memory, HDD, SSD, etc. of a computer, or in a database or storage device through a network. Any device that can hold the personal information may be employed.

The work process information holding unit 120 may hold at least one item of work process information. The work process information contains worker requirement information about a person who performs a work, and detailed work information. The worker requirement information contains information for identifying an individual who performs a work, such as an ID, name, etc. of the individual, or a requirement for a worker who performs a work indicated by the detailed work information. The worker requirement information may contain information for identifying a worker who performs a work, such as an ID, name, etc. of the individual, or a requirement for a worker who performs a work indicated by the detailed work information. The requirement for a worker, which corresponds to the attribute information of the personal information held in the personal information holding unit 110, is checked against the attribute information to search for a worker satisfying the requirement. The detailed work information may contain at least one item of information about details of a work, such as a tool required for a work procedure or work, a robot which works with a worker and its operating program, a work place or region, a work time, and the like. The work procedure may be a work procedure for a worker or a list of paths, positions, and orientations of a robot or worker in the course of a robot operating program or work. The information about work tools may be names and shapes of the tools, positions and orientations of the tools, ways to use the tools, or programs for allowing a robot to use the tools. The work place or region may be a map, two-dimensional region, or three-dimensional region indicating a position or work range where a worker and a robot work, and a region which is dangerous to enter.

The work process information may be held in a storage device, such as a memory, HDD, SSD, etc. of a computer, or in a database or storage device through a network. Any device that can hold the work process information may be employed.

The measuring unit 130 may obtain information which is checked against the individual identification information held in the personal information holding unit 110. A measuring device, such as a camera, range sensor, RGB-D camera, or the like, may be used to capture an image of the face or body of a person, thereby obtaining a two-dimensional image or range image. From these items of information, a three-dimensional model or feature amount may be obtained. The measuring device may be a thermometer or infrared camera. There may be a plurality of measuring devices. The measuring device may also be a weighing scale or microphone, a sensor which is used to measure a fingerprint, veins, an iris, or the like, or an input device, such as a touchscreen, scanner, keyboard, ID card reader, or the like, instead of the above non-contact sensors. The measuring device may also be a combination of the measuring units 130 that can be used to obtain information which allows for identification of an individual. The measuring device used in the measuring unit 130 may also be set in a robot, or in an environment in which a work is performed. There may be a plurality of measuring devices in a robot. The measuring device may be provided at a place away from the work region, such as an entrance of a factory (premises where a work is performed) or the like, or any location where a target person can be measured.

The person recognizing unit 140 may check measurement data obtained by the measuring unit 130 against the identification information of individuals held in the personal information holding unit 110, to recognize a person of the measurement data. If there is information matching the measurement data found in the identification information, the person is recognized as being associated with the identification information. If there is no matching information, the person is recognized as an unknown person. If the measurement data contains information of a plurality of persons, the plurality of persons may be recognized. The checking is performed according to the measuring unit 130. If the measuring unit 130 is a camera or range sensor, the measurement data may be checked against face information registered in the identification information using a known technique (Iwai, Lao, Yamaguchi, and Hirayama, "A Survey on Face Detection and Face Recognition," Technical Reports of Information Processing Society of Japan, CVIM, 2005(38), 343-368, 2005-05-12, etc.). Data obtained by various sensors may also be checked against fingerprints, veins, irises, voices, writing, gaits, or the like using a known technique. The checking against fingerprints, veins, irises, writing, or the like may be performed by pattern matching between images of these features registered as identification information and images obtained by the measuring unit 130. In the case of a voice, a voice print obtained by the measuring unit 130 may be checked against voice prints registered as identification information by pattern matching. In the case of a gait, a moving image obtained by the measuring unit 130 may be checked using a known technique (Y. Makihara, R. Sagawa, Y. Mukaigawa, T. Echigo, and Y. Yagi, "Which Reference View is Effective for Gait Identification Using a View Transformation Model?," Proc. of the IEEE Computer Society Workshop on Biometrics 2006, New York, USA, Jun. 2006, etc.). A password or gesture which is input using an input device, such as a touchscreen, keyboard, or the like, may be checked against previously registered identification information, such as passwords, patterns, or the like. A person matching the ID of an individual read using an ID card reader may be recognized. Moreover, a position or orientation of the person may also be recognized using a known technique (Jamie Shotton, Toby Sharp, Alex Kipman, Andrew Fitzgibbon, Mark Finocchio, Andrew Blake, Mat Cook, and Richard Moore, 2013, Real-time human pose recognition in parts from single depth images, Commun. ACM 56, 1 (January 2013), 116-124, etc.).

The work information managing unit 150 may obtain the personal information held in the personal information holding unit 110 and the work process information held in the work process information holding unit 120 to manage a work which is performed by a robot and a worker, according to an individual recognized by the person recognizing unit 140. If a work performed by each worker is previously registered in the work process information, the personal information of a recognized individual and the work process information about a work process in charge of the individual are obtained, and this combination of information is held as the work information. If a work performed by a worker is not registered in the work process information, the attribute information of a recognized person may be checked against the worker requirement information contained in the work process information, and a person satisfying the worker requirement information may be assigned to the work process information.

The work information may be held in a storage device, such as a memory, HDD, SSD, etc. of a computer, or in a database or storage device through a network. Any device that can hold the work information may be employed.

The controlling unit 160 controls at least one robot based on the work information managed by the work information managing unit 150. The work information contains a combination of the personal information and the work process information, based on which a robot is controlled. For example, a position of a robot or an operation path of a robot or robot arm may be set based on a physical feature of a recognized individual, such as a height, dominant hand, or the like, that is contained in the personal information. The driving speed of a robot may be set based on a work history, takt time, skill level, etc. of a recognized individual. Moreover, preparation of tools or delivery of materials or parts for a work may be automatically performed by a robot based on the work process information. Also, if a recognized person is an unknown person, or a person who is not a worker in charge of the work enters a predetermined work place or region contained in the work information, the driving speed of a robot may be decelerated or stopped to reduce a risk of an accident.

A robot which is controlled may be any machine in any form or configuration that can automatically work with a worker. A single-arm or double-arm robot, a walking robot, or a robot having a drive unit, such as a wheel or the like, may be employed. An automatic transfer vehicle (transfer robot) may be employed. A plurality of robots may be employed. A robot that can be remotely controlled through a network may be employed.

The presenting unit 270 may present a state of at least one of the person recognizing unit 240, the work information managing unit 250, and the controlling unit 260. A device which is used in presentation may be a display or loudspeaker. Any device that can notify persons around a robot of a state of the system may be employed, including a light source, such as a lamp, LED, or the like, a flag, a gate, a barrier, and the like. These may be used in combination. The state information which is presented may be personal information of an individual recognized by the person recognizing unit 240. Work process information about a work process assigned to a recognized individual may be obtained from the work information managing unit 250, and the work process information or a manual may be presented. The driving speed of a robot or the detailed work information or internal state of a robot may be presented. If a person who is not expected to work in a predetermined region, which is determined based on the personal information and the work process information, enters the predetermined region, warning information may be presented.

The updating unit 370 may update or add at least one of the personal information, the work process information, and the work information. Also, the personal information or work process information may be manually updated or added using an input device, such as a mouse, keyboard, touch sensor, or the like. The work process information, work time, number of times, etc. of a work performed by a worker may be automatically or manually added as a work history to the attribute information of the worker. Measurement data of a person which is not recognized may be added or updated as identification information to or in the personal information using an input device. An operation or orientation of a worker may also be measured using a measuring unit 330 or input using an input device, to learn the operation or orientation of the worker. The learning data may be added to or updated in the work process information held in the work process information holding unit 320, or may be added to or updated in the attribute information of the personal information of the worker themselves held in the personal information holding unit 310.

According to the present invention, the work efficiency of a robot system in which a robot can work with a worker can be improved while ensuring the safety of the worker.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-117095, filed Jun. 5, 2014, which is hereby incorporated by reference herein in its entirety.

What is claimed is:

1. An apparatus comprising:
one or more processors; and
one or more memories including instructions stored thereon that, when executed by the one or more processors, cause the apparatus to:
hold data related to a worker;
obtain measurement data, which includes an image containing a face of the worker, for recognizing the worker;
recognize the worker based on the data related to the worker and the measurement data;
determine work information about work which the worker and a robot perform on a target object together, corresponding to the recognized worker, based on attribute information which includes a physical feature of the recognized worker's body and an operating motion of work performed in the past by the recognized worker; and
control at least one of a position, orientation, and path of the robot based on the work information to reduce a change in an orientation of the worker when the worker and the robot perform the work on the target object together.

2. The apparatus according to claim 1, wherein the instructions, when executed by the one or more processors, further cause the apparatus to control a driving speed of the robot based on the work information.

3. The apparatus according to claim 1, wherein the instructions, when executed by the one or more processors, further cause the apparatus to control at least one of a position, orientation, and path of the robot based on the work information to reduce a change in a position of the worker.

4. The apparatus according to claim 1, wherein the instructions, when executed by the one or more processors, further cause the apparatus to at least decelerate or stop the robot when a person who is not the worker expected to work in a region enters the region, based on the work information.

5. The apparatus according to claim 1, wherein the instructions, when executed by the one or more processors, further cause the apparatus to present information indicating a state of recognition of the worker.

6. The apparatus according to claim 5, wherein the instructions, when executed by the one or more processors, further cause the apparatus to present warning information when a person who is not the worker expected to work in a region enters the region, based on the work information.

7. The apparatus according to claim 1, wherein the instructions, when executed by the one or more processors, further cause the apparatus to control the robot so that the robot transfers and places at least one of tools or parts used in the work, based on the work information.

8. The apparatus according to claim 1, wherein the instructions, when executed by the one or more processors, further cause the apparatus to update or add at least one of information about the worker and the work information.

9. The apparatus according to claim 8, wherein the instructions, when executed by the one or more processors, further cause the apparatus to add work history of a recognized individual to personal information of the individual.

10. The apparatus according to claim 1, wherein the attribute information of the recognized worker is at least one of the physical feature of the worker's body, a skill level for the work of the worker, and a work path in the work of the worker.

11. The apparatus according to claim 1, wherein the work information is a driving speed of the robot.

12. The apparatus according to claim 1, wherein the work is to transfer the target object between the worker and the robot.

13. The apparatus according to claim 1, wherein the physical feature of the recognized worker's body is at least any of information regarding a height and information regarding a dominant hand.

14. A method for controlling an apparatus, the method comprising:
   holding data related to a worker;
   obtaining measurement data, which includes an image containing a face of the worker, for recognizing the worker;
   recognizing the worker based on the data related to the worker and the measurement data;
   determining work information about a work which the worker and a robot perform on a target object together, corresponding to the recognized worker, based on attribute information which includes a physical feature of the recognized worker's body and an operating motion of work performed in the past by the recognized worker; and
   controlling at least one of a position, orientation, and path of the robot based on the work information to reduce a change in an orientation of the worker when the worker and the robot perform the work on the target object together.

15. A non-transitory computer-readable storage medium storing a computer program for causing a computer to:
   hold data related to a worker;
   obtain measurement data, which includes an image containing a face of the worker, for recognizing the worker;
   recognize the worker based on the data related to the worker and the measurement data;
   determine work information about a work which the worker and a robot perform on a target object together, corresponding to the recognized worker, based on attribute information which includes a physical feature of the recognized worker's body and an operating motion of work performed in the past by the recognized worker; and
   control at least one of a position, orientation, and path of the robot based on the work information to reduce a change in an orientation of the worker when the worker and the robot perform the work on the target object together.

* * * * *